May 11, 1926.
B. B. THOMAS
FLUSHING VALVE
Filed Oct. 16, 1924
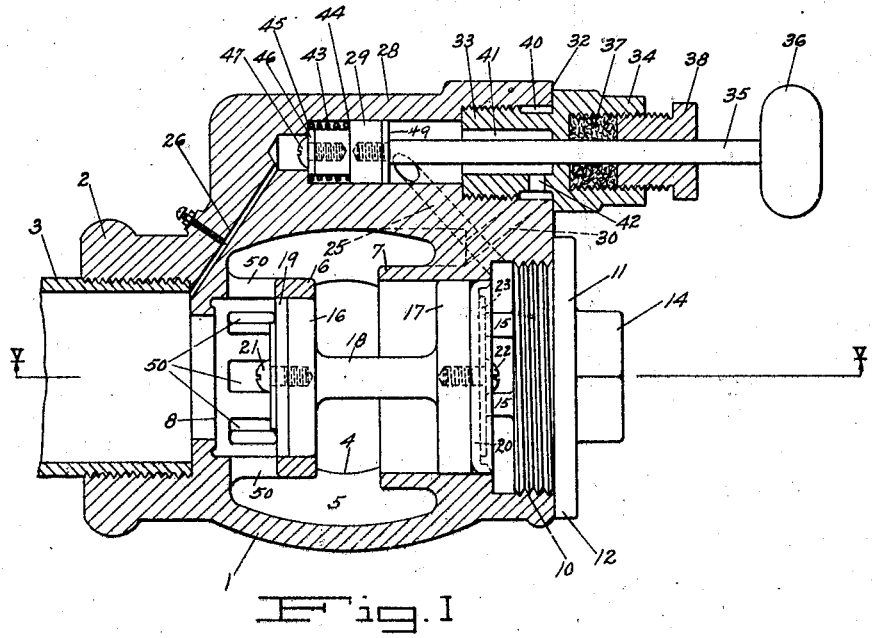
Fig. I
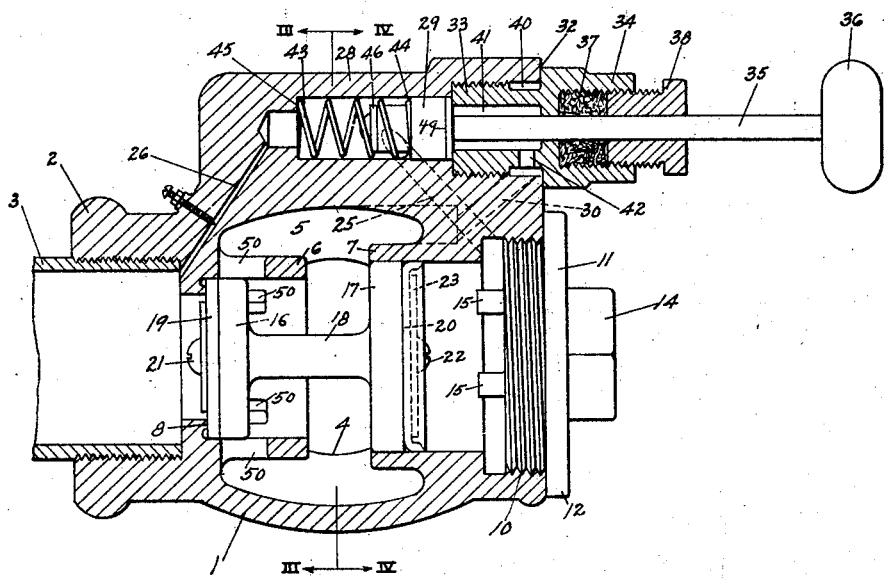
Fig. II
Inventor:
Ben. B. Thomas,
By Atkins & Atkins,
Attorneys May 11, 1926.  
B. B. THOMAS  
FLUSHING VALVE  
Filed Oct. 16, 1924  
1,584,407  
2 Sheets-Sheet 2
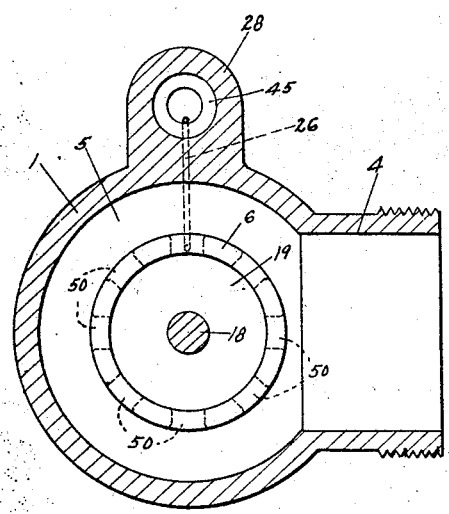
Fig. III
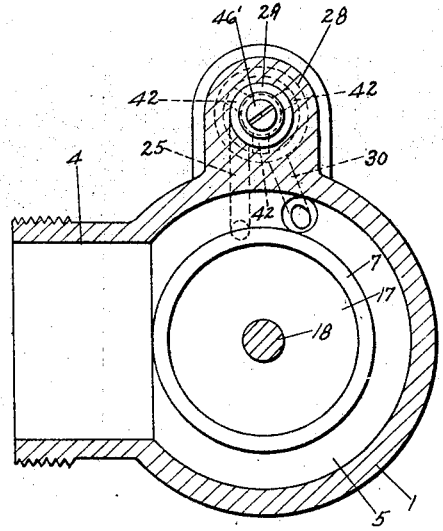
Fig. IV
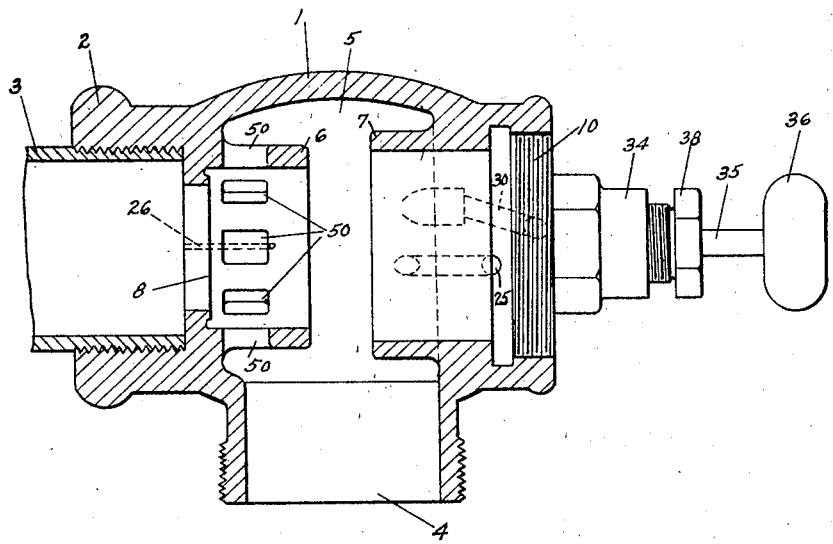
Fig. V
Inventor:  
Ben B. Thomas,  
By Atkins & Atkins,  
Attorneys Patented May 11, 1926.

1,584,407

UNITED STATES PATENT OFFICE.

BEN B. THOMAS, OF PORTLAND, OREGON.

FLUSHING VALVE.

Application filed October 16, 1924. Serial No. 744,012.

My invention relates to valves, and has for its general object the production of a flushing valve adapted under initiative manipulation to be actuated by pressure of the liquid whose flow it controls.

Besides the advantages of its efficiency, simplicity, and economy of cost of production and upkeep, my valve possesses the additional distinctive advantage of means provided for controlling the closure of the valve after each manipulation and for regulating the time of closure. Moreover, said regulating and controlling means is made readily adjustable from the outside of the valve shell.

What constitutes my invention will be hereinafter specified in detail and succinctly defined in the appended claims.

In the accompanying drawings, in which I illustrate my invention in present preferred form of embodiment, Figure I is a medial longitudinal section of my valve, with parts thereof in elevation, the main valve and manual control valve being shown in their respective positions for opening the main valve.

Figure II is a view similar to Figure I, but showing the main valve closed and the manual control valve in corresponding position, that is to say, at rest.

Figure III is a transverse section on the line III—III of Figure II.

Figure IV is a similar section on the line IV—IV of Figure II.

Figure V is a section taken on the line V—V of Figure 1, the same being in a plane at right angles to that in which Figure I is taken, and with the main valve omitted.

Referring to the numerals on the drawings, 1 indicates a valve shell having an inlet connection 2 to which a supply pipe 3 is united, for example, by being threaded into said connection, and having an outlet vent 4 disposed, for example, at right angles to the connection 2.

5 indicates the internal cavity or barrel of the valve shell into which extend, from opposite ends thereof and in opposite directions, preferably at right angles to the outlet vent 4, a cylindrical valve guide 6 and a cylindrical piston guide 7. The valve guide 6 is, for operative reasons hereinafter stated, of smaller diameter than the piston guide 7, and it is provided at its end next to the pipe 3 with an annular valve-seat 8.

The piston guide 7 is preferably unobstructed from end to end, and opens at the end which is opposite the pipe 3, into an internally threaded cylindrical aperture 10. A screw plug 11 having a stop-flange 12 and a wrench-head 14, is threaded into the aperture 10 whose diameter is preferably somewhat greater than that of the piston guide 7. Stop-pieces 15, provided preferably on the inner face of the plug 11, project into the bore of the piston guide 7.

The bores of the guides 6 and 7 are fitted, respectively, with a valve 16 and a piston 17 that are united, as by an intermediate stem 18, to constitute a piston actuated valve. The valve 16 and the piston 17 are provided with suitable packing washers 19 and 20, respectively, which are secured in place, as by headed machine screws 21 and 22 threaded into apertures in the opposite ends thereof, and which are designed and adapted to effect a water-tight fit with the inner walls of their respective guides 6 and 7. The washer 20, being preferably a leather cup washer, is held to the piston 17 by a rigid, flat plate, for example a brass washer 23 interposed between it and the plug 11 and confined in place against the washer 20 by the head of the screw 22.

The facial area of the valve 16 differs from that of the piston 17 in order that the valve 16 may be, in accordance with a well known principle of physics, kept closed against the valve seat 8, by liquid pressure. In the present instance said pressure is supplied from the pipe 3, and is directed into operative communication with a well-defined space provided for it between the opposing faces of the piston 17 and the plug 11. It is for that reason that the guides 6 and 7 which accommodate the valve 16 and the piston 17, respectively, are made of different diameters as already specified.

The means employed for effecting the communication just mentioned consist preferably of two ducts 25 and 26 formed, for example, in the body of the shell 1.

Said ducts, at one end of each, communicate, respectively, with the defined space aforesaid and with the interior of the pipe 3. At their respective ends opposite to those just named, the said ducts communicate with the bore of the case 28 of a manual control valve with which case the shell 1 is combined and preferably incorporated.

The ends of said ducts, where they enter the bore of the case 28, are spearated a sufficient distance to admit of the introduction of between them of a cutoff valve-head 29, that works with piston fit within said bore. When so interposed within the bore between the ends of the ducts 25 and 26, the valve-head 29 breaks communication between said ducts. Consequently thereupon, liquid pressure in the pipe 3 will tend to unseat the valve 16 from its seat 8, and will effect that result if means of egress for the liquid contents of the aforesaid defined space between the piston 17 and the plug 11 is provided. For the purpose of providing such means of egress, I form, for example, in the body of the shell 1, a third duct 30 which effects communication at a point selected preferably between the bore of the valve case 28 near its open end and the barrel of the shell 1 surrounding the guides 6 and 7.

The bore of the valve case 28 opens outwardly and is enlarged at its outer end sufficiently to define an annular shoulder 32 which determines the inner end of a cylindrical recess internally threaded to make joint with the externally threaded extension 33 of a stuffing box 34. 35 indicates a valve-stem which is fastened at its inner end to the valve-head 29, and passing through the stuffing box 34 is provided on its outer end with a push handle 36. The stuffing box is, as usual, provided with suitable packing 37 and a gland 38.

The stuffing box extension 33 is provided with a coaxial recess 40 as a means adapted to effect communication with an annular chamber 41 formed in the body of the extension 33 where the duct 30 enters the bore of the case 28. The chamber 41 constitutes a passage for effecting, as through a port 42, intercommunication between the duct 30 and the bore of the case 28.

The valve-head 29 is normally urged towards the outer end of the case 28 by liquid pressure as well as by an auxiliary spring 43. Said spring is preferably coiled around a reduced end of the valve-head 29 defined by an annular shoulder 44, and is seated between said shoulder and a reducing shoulder 45 provided in the bore of the case 28.

A gasket 46 secured, as by a headed screw 47, to the reduced end of the valve-head 29, makes water tight closure against the shoulder 45 as often as the valve-head 29 is forced against it, as it is when sufficient hand-pressure is applied to the handle 36.

A gasket washer 49, similar to 46, is, at the end of the valve-head 29 opposite that which carries the washer 46, provided for closing the chamber 41 whenever the said valve-head is, under hydraulic or spring pressure or both, seated against the inner end of the stuffing box extension 33, as shown in Figure II.

In this connection, in order to provide at all times an operative sufficiency of pressure for actuating the valve 16, I provide, as by the employment of a ring of vents 50 in the wall of the guide 6, for a constriction of the volume of liquid discharge from the pipe 3 to one smaller than the discharge from the vent 4. By this means there is, in use, always maintained in the pipe 3 sufficient liquid pressure to effect closure of the valve 16 against its seat 8.

The pressure just referred to may be regulated and controlled by means provided, that are conveniently accessible to manipulative adjustment from outside the valve. In its simplest and therefore preferred form, such means may consist of a screw 52 threaded into an aperture provided for it in the shell 1, as shown, for example, in Figures I and II. The screw 52 has a conical or similar point which, by reason of the disposition of the aperture in which the screw works, cuts across the duct 26 with throttling effect. A set-nut 53 may be used to fix the screw to any adjustment of it that may be made.

A brief description of the operation of my valve follows.

Figure II shows, as has been specified, the parts of my valve in their several positions occupied while the valve is at rest, the valve 16 being closed against its seat 8, and the gasket 49 of the valve-head 29 seated against the end of the stuffing box extension 33. In that position of the valve members, liquid pressure from the pipe 3 is communicated, with normal closing effect upon the valve 16 as just specified, through the duct 26, the bore of the case 28, and the duct 25, successively, into the enclosed space behind the piston 17.

If now, one wishes to operate the valve with flushing effect, all that is necessary is to push the handle 36 as far as it will go. Thereupon, the valve-head 29 will assume the position shown in Figure I, with the effect of shutting off flow through the duct 26, and of putting into communication, in the manner heretofore specified, the ducts 25 and 30. The result will be to allow free egress through said ducts of water from the space behind the piston 17, and to permit the valve 16, under liquid pressure from the pipe 3, to leave its seat, and allow free discharge from said pipe through the vent 4 with desired flushing effect. The operation just described being substantially instantaneous, a momentary push upon the handle 36 is all that is demanded.

As soon as the handle 36 is relieved of manual pressure upon it, the valve 16 begins to close, in consequence of restoration under pressure derived instantly from the spring 43 and more gradually, it may be, from flow of water through the duct 26. If said flow is free enough the complete closure of the valve 16 will be substantially instantaneous, and continued pressure upon the handle 36 would, in such case, be necessary to control the time of such closure. Such mode of control is practicable, but is deemed ordinarily undesirable.

Instead of manually operative means for control of the time of closure, I prefer to employ the automatic means represented by the screw 52, by proper adjustment of which the residual pressure delivered from the pipe 3 through the duct 26 may be regulated within any practicable limits desired.

It may be observed that all parts of my valve are conveniently accessible while the valve is in place, for any attention it may require, such, for example, as that necessary for the renewal or repair of parts.

What I claim is:

1. A valve having in combination a body provided with inlet and outlet openings, a barrel formed in said body, oppositely extending spaced guides in said barrel, one of said guides having openings communicating the inlet with the barrel, a valve mounted in said last mentioned guide, a piston in the other of said guides and connected to the valve, said body having a chamber therein adjacent said piston and a longitudinally extending recess, a manually operative valve reciprocally mounted in said recess, means for conducting liquid from said inlet to one side of the piston for closing the inlet valve when the manually operated valve is in one position, and a passage communicating the barrel with the chamber through said recess for releasing the pressure in the chamber when the manually operated valve is moved to a different position.

2. A valve having in combination a body provided with inlet and outlet openings, a barrel formed in said body, oppositely extending spaced guides in said barrel, one of said guides having openings communicating the inlet with the barrel, a main valve mounted in said last mentioned guide, a piston in the other of said guides and connected to the main valve, said body having a chamber therein adjacent said piston and a longitudinally extending recess, a manually operative valve reciprocally mounted in said recess, ducts communicating the recess with the inlet and the chamber for conducting liquid to one side of the piston to close the main valve when the manually operated valve is in one position, means for controlling the flow of liquid through said ducts, and a passage communicating the barrel with the chamber through the recess for releasing the liquid pressure in the chamber when the manually operated valve is moved to a different position.

3. A valve having in combination a body provided with inlet and outlet openings, a barrel formed in said body, oppositely extending spaced guides in said barrel, one of said guides having openings communicating the inlet with the barrel, a main valve mounted in said last mentioned guide, a piston in the other of said guides and connected to the main valve, said body having a chamber therein adjacent said piston and a longitudinally extending recess, a manually operative valve reciprocally mounted in said recess, said body having a passage connecting the inlet with said recess, a threaded cut off screw extending transversely into said passage and operatively accessible from outside the valve for regulating the pressure closing the main valve, a passage communicating the recess with the chamber for conducting liquid to one side of the piston to close the main valve when the manually operated valve is in one position, and a passage communicating the barrel with the chamber through the recess for releasing the liquid pressure in the chamber when the manually operated valve is moved to a different position.

4. A flush valve having in combination a body provided with inlet and outlet openings, a barrel formed in said body, a piston actuated valve in said barrel for controlling the supply of fluid to the outlet, said body having a chamber adjacent one end of the piston valve and a longitudinally extending recess, a coaxial extension communicating with said recess, a manually operative valve reciprocally mounted in said recess, said body having a passage communicating said inlet with said recess, and a separate passage communicating the recess with said chamber, and said extension having means communicating said recess with said barrel, whereby upon the reciprocating valve being moved to one position fluid is conducted from the inlet through the recess to the chamber to close the piston valve, and when moved to another position permits the draining of the fluid from the chamber to the barrel to open the piston valve.

5. A valve having in combination a body provided with inlet and outlet openings, a barrel formed in said body, oppositely extending spaced guides in said barrel, one of said guides having openings communicating the inlet with the barrel, a main valve mounted in said last mentioned guide, a piston in the other of said guides and connected to the main valve, said body having a chamber therein adjacent said piston and a longitudinally extending recess, a manually operative valve reciprocally mounted in said recess, said body having a passage connecting the inlet with said recess, means operatively accessible from outside the valve for regulating the pressure closing the main valve, a passage communicating the recess with the chamber for conducting liquid to one side of the piston to close the main valve when the manually operated valve is in one position, and a passage communicating the barrel with the chamber through the recess for releasing the liquid pressure in the chamber when the manually operated valve is moved to a different position.

In testimony whereof, I have hereunto set my hand.

BEN B. THOMAS.